(12) United States Patent
Nakane et al.

(10) Patent No.: US 7,986,120 B2
(45) Date of Patent: Jul. 26, 2011

(54) PULSE MOTOR CONTROL DEVICE, CONTROL METHOD, CONTROL PROGRAM, AND IMAGING APPARATUS

(75) Inventors: Toshihide Nakane, Kanagawa (JP); Tomokuni Yamashina, Kanagawa (JP); Shuji Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 546 days.

(21) Appl. No.: 12/178,714

(22) Filed: Jul. 24, 2008

(65) Prior Publication Data

US 2009/0026996 A1 Jan. 29, 2009

(30) Foreign Application Priority Data

Jul. 26, 2007 (JP) .............................. P2007-194274

(51) Int. Cl.
*H02P 8/00* (2006.01)
(52) U.S. Cl. ........................ 318/696; 318/685
(58) Field of Classification Search .................. 318/696, 318/685, 560, 599, 400.01, 721, 811; 396/260; 400/154.5; 968/817
See application file for complete search history.

(56) References Cited

U.S. PATENT DOCUMENTS

| | | | | |
|---|---|---|---|---|
| 5,015,937 A * | 5/1991 | Wright et al. | ................. | 318/696 |
| 5,627,616 A * | 5/1997 | Sergeant et al. | ............. | 396/427 |
| 5,802,412 A * | 9/1998 | Kahn | ............................ | 396/427 |
| 6,597,147 B2 * | 7/2003 | Li et al. | ......................... | 318/696 |
| 6,664,754 B2 * | 12/2003 | Misumi | ......................... | 318/696 |
| 6,913,403 B2 * | 7/2005 | Paolantonio et al. | ......... | 396/427 |
| 7,339,342 B2 * | 3/2008 | Harada et al. | ................ | 318/685 |
| 2003/0193611 A1 * | 10/2003 | Yoshimura | .................... | 348/374 |
| 2008/0278578 A1 * | 11/2008 | Kahn | ............................ | 348/143 |

FOREIGN PATENT DOCUMENTS

| | | |
|---|---|---|
| JP | 6-153593 | 5/1994 |
| JP | 10-191694 | 7/1998 |
| JP | 11 41989 | 2/1999 |
| JP | 2003 304698 | 10/2003 |
| JP | 2006-211012 | 8/2006 |

* cited by examiner

*Primary Examiner* — Walter Benson
*Assistant Examiner* — Antony M Paul
(74) *Attorney, Agent, or Firm* — Frommer Lawrence & Haug LLP; William S. Frommer

(57) ABSTRACT

A pulse motor control device includes a drive pulse generator configured to generate a drive pulse in accordance with a set cycle, a pulse motor driver configured to generate an excitation current of a pattern corresponding to the number of division per one step of a pulse motor based on the drive pulse supplied from the drive pulse generator, the number of division being set in the pulse motor driver, the pulse motor driver supplying the excitation current to the pulse motor to thereby drive the pulse motor based on micro-step driving, and a controller configured to set the cycle in the drive pulse generator every time the drive pulse is supplied from the drive pulse generator.

7 Claims, 5 Drawing Sheets

PULSE MOTOR CONTROL DEVICE, CONTROL METHOD, CONTROL PROGRAM, AND IMAGING APPARATUS

CROSS REFERENCES TO RELATED APPLICATIONS

The present invention contains subject matter related to Japanese Patent Application JP 2007-194274, filed in the Japan Patent Office on Jul. 26, 2007, the entire contents of which being incorporated herein by reference.

BACKGROUND OF THE INVENTION

1. Field of the Invention

The present invention relates to a pulse motor control device, a control method, a control program, and imaging apparatus.

2. Description of Related Art

There is provided imaging apparatus that pans and tilts a video camera for capturing, by an imaging element, a subject image introduced through a photographic optical system.

Such imaging apparatus is used to form a surveillance camera system for monitoring an outdoor or indoor area, or to form a television conference system for shooting participants of a conference, for example.

In many cases, in such imaging apparatus, a pulse motor (stepping motor) is used as a drive source for swiveling a video camera around a virtual axis extending along the vertical direction (swiveling the video camera in the pan direction) and a drive source for swiveling the video camera around a virtual axis extending along a direction perpendicular to the vertical direction (swiveling the video camera in the tilt direction).

The pulse motor allows easy position control through only counting of the number of drive pulses, but is disadvantageous in smooth low-speed rotation.

Meanwhile, enhancement in the image quality and increase in the number of pixels for video cameras are being promoted in recent years. Therefore, unless the rotation of the pulse motor is smooth in swiveling of the video camera at low speed, noticeable unnatural blurring will occur in captured video.

To address this problem, a scheme to prevent blurring in video captured by a video camera is often employed. In this scheme, segmented driving of the pulse motor is carried out based on micro-step driving to thereby allow smooth low-speed rotation by the pulse motor.

However, in the case of driving a pulse motor based on micro-step driving, more drive pulses whose number is larger by a factor of the multiple number corresponding to the number of segmentation are needed to rotate the pulse motor by the same angle as that in a normal pulse drive system.

Thus, compared with the normal pulse drive system, the micro-step driving involves increase in the number of drive pulses generated per unit time, and hence a heavier burden on the unit that generates the drive pulse.

To address this problem, a technique has been proposed. In this technique, in driving of a pulse motor based on micro-step driving, plural clock pulses are generated per one time of interrupt processing of a microcomputer, and the pulse motor is driven by micro-step driving based on the clock pulse (refer to Japanese Patent Laid-open No. Hei 11-41989).

Furthermore, another technique has also been proposed. In this technique, in driving of a pulse motor based on micro-step driving, the micro-step value of the micro-step excitation system is changed to e.g. ½, ¼, ⅛, or 1/16 depending on the rotational speed (refer to Japanese Patent Laid-open No. 2003-304698).

SUMMARY OF THE INVENTION

However, even in the former related art, if the number of division into the micro-steps is set large for smooth low-speed rotation (if the micro-step is further segmented), the number of drive pulses per unit time necessary to rotate the pulse motor at high speed becomes significantly large, and it is technically difficult to generate such a significantly-large number of drive pulses. In addition, in the latter related art, how to control the micro-step and the number of drive pulses generated per unit time is not disclosed.

There is a need for the present invention to provide a pulse motor control device, a control method, a control program, and imaging apparatus that are advantageous in ensuring both smooth low-speed rotation and alert high-speed rotation by a pulse motor while reducing the burden of generation and control of a drive pulse.

According to an embodiment of the present invention, there is provided a pulse motor control device. The control device includes a drive pulse generator configured to generate a drive pulse in accordance with a set cycle, and a pulse motor driver configured to generate an excitation current of a pattern corresponding to the number of division per one step of a pulse motor based on the drive pulse supplied from the drive pulse generator. The number of division is set in the pulse motor driver. The pulse motor driver supplies the excitation current to the pulse motor to thereby drive the pulse motor based on micro-step driving. The control device further includes a controller configured to set the cycle in the drive pulse generator every time the drive pulse is supplied from the drive pulse generator. The controller switches the number of division between a first number of division N and a second number of division M smaller than the first number of division N, and sets the number of division in the pulse motor driver. A cycle multiplier for multiplying the cycle that is to be set in the drive pulse generator by the controller is provided. Multiplication of the cycle by the cycle multiplier is so carried out that the cycle set in the drive pulse generator in the state in which the second number of division M is set in the pulse motor driver becomes N/M times the cycle set in the drive pulse generator in the state in which the first number of division N is set in the pulse motor driver.

According to another embodiment of the present invention, there is provided a control method for a pulse motor for which a drive pulse generator and a pulse motor driver are provided. The drive pulse generator generates a drive pulse in accordance with a set cycle. The pulse motor driver generates an excitation current of a pattern corresponding to the number of division per one step of the pulse motor based on the drive pulse supplied from the drive pulse generator. The number of division is set in the pulse motor driver. The pulse motor driver supplies the excitation current to the pulse motor to thereby drive the pulse motor based on micro-step driving. The control method includes the steps of setting the cycle in the drive pulse generator every time the drive pulse is supplied from the drive pulse generator, switching the number of division between a first number of division N and a second number of division M smaller than the first number of division N and setting the number of division in the pulse motor driver, and multiplying the cycle that is to be set in the drive pulse generator in such a way that the cycle set in the drive pulse generator in the state in which the second number of division M is set in the pulse motor driver becomes N/M times the cycle set in the drive pulse generator in the state in which the first number of division N is set in the pulse motor driver.

According to yet another embodiment of the present invention, there is provided a control program for controlling a control device for a pulse motor. The control device includes a drive pulse generator, a pulse motor driver, and a controller. The drive pulse generator generates a drive pulse in accordance with a set cycle. The pulse motor driver generates an excitation current of a pattern corresponding to the number of division per one step of the pulse motor based on the drive pulse supplied from the drive pulse generator. The number of division is set in the pulse motor driver. The pulse motor driver supplies the excitation current to the pulse motor to thereby drive the pulse motor based on micro-step driving. The control program causes the controller to execute the steps of setting the cycle in the drive pulse generator every time the drive pulse is supplied from the drive pulse generator, switching the number of division between a first number of division N and a second number of division M smaller than the first number of division N and setting the number of division in the pulse motor driver, and multiplying the cycle that is to be set in the drive pulse generator in such a way that the cycle set in the drive pulse generator in the state in which the second number of division M is set in the pulse motor driver becomes N/M times the cycle set in the drive pulse generator in the state in which the first number of division N is set in the pulse motor driver.

According to yet another embodiment of the present invention, there is provided imaging apparatus that swivels a video camera for capturing a subject image and producing a video signal, by using rotational driving force of a pulse motor. The imaging apparatus includes a control device that controls the rotation of the pulse motor. The control device includes a drive pulse generator configured to generate a drive pulse in accordance with a set cycle, and a pulse motor driver configured to generate an excitation current of a pattern corresponding to the number of division per one step of the pulse motor based on the drive pulse supplied from the drive pulse generator. The number of division is set in the pulse motor driver. The pulse motor driver supplies the excitation current to the pulse motor to thereby drive the pulse motor based on micro-step driving. The control device further includes a controller configured to set the cycle in the drive pulse generator every time the drive pulse is supplied from the drive pulse generator. The controller switches the number of division between a first number of division N and a second number of division M smaller than the first number of division N, and sets the number of division in the pulse motor driver. A cycle multiplier for multiplying the cycle that is to be set in the drive pulse generator by the controller is provided. Multiplication of the cycle by the cycle multiplier is so carried out that the cycle set in the drive pulse generator in the state in which the second number of division M is set in the pulse motor driver becomes N/M times the cycle set in the drive pulse generator in the state in which the first number of division N is set in the pulse motor driver.

According to the embodiments of the present invention, at the time of the low-speed rotation of the pulse motor, smooth low-speed rotation can be realized by setting the first number of division N in the pulse motor driver. At the time of high-speed rotation, alert high-speed rotation can be realized by setting the second number of division M smaller than the first number of 0 division N in the pulse motor driver. Furthermore, the number of drive pulses generated per unit time can be suppressed through the switching between the first number of division N and the second number of division M. Therefore, the configurations according to the embodiments of the present invention are advantageous in reducing the burden of generation and control of the drive pulse.

In addition, the cycle to be set in the drive pulse generator is multiplied by the cycle multiplier in accordance with the switching between the first number of division N and the second number of division M. Therefore, the configurations according to the embodiments of the present invention are advantageous in setting the proper cycle in the drive pulse generator irrespective of a change in the number of division of the micro-step drive system for the pulse motor.

DETAILED DESCRIPTION OF THE PREFERRED EMBODIMENT

An example in which a pulse motor control device, a control method, and a control program according to an embodiment of the present invention are applied to imaging apparatus will be described below with reference to the drawings.

In the following, for convenience of description, initially a general configuration of imaging apparatus will be described, and then a control device as a comparative example for the control device according to the embodiment of the present invention will be described. Thereafter, details of a control device 16 according to the embodiment of the present embodiment will be described.

Figure 1:
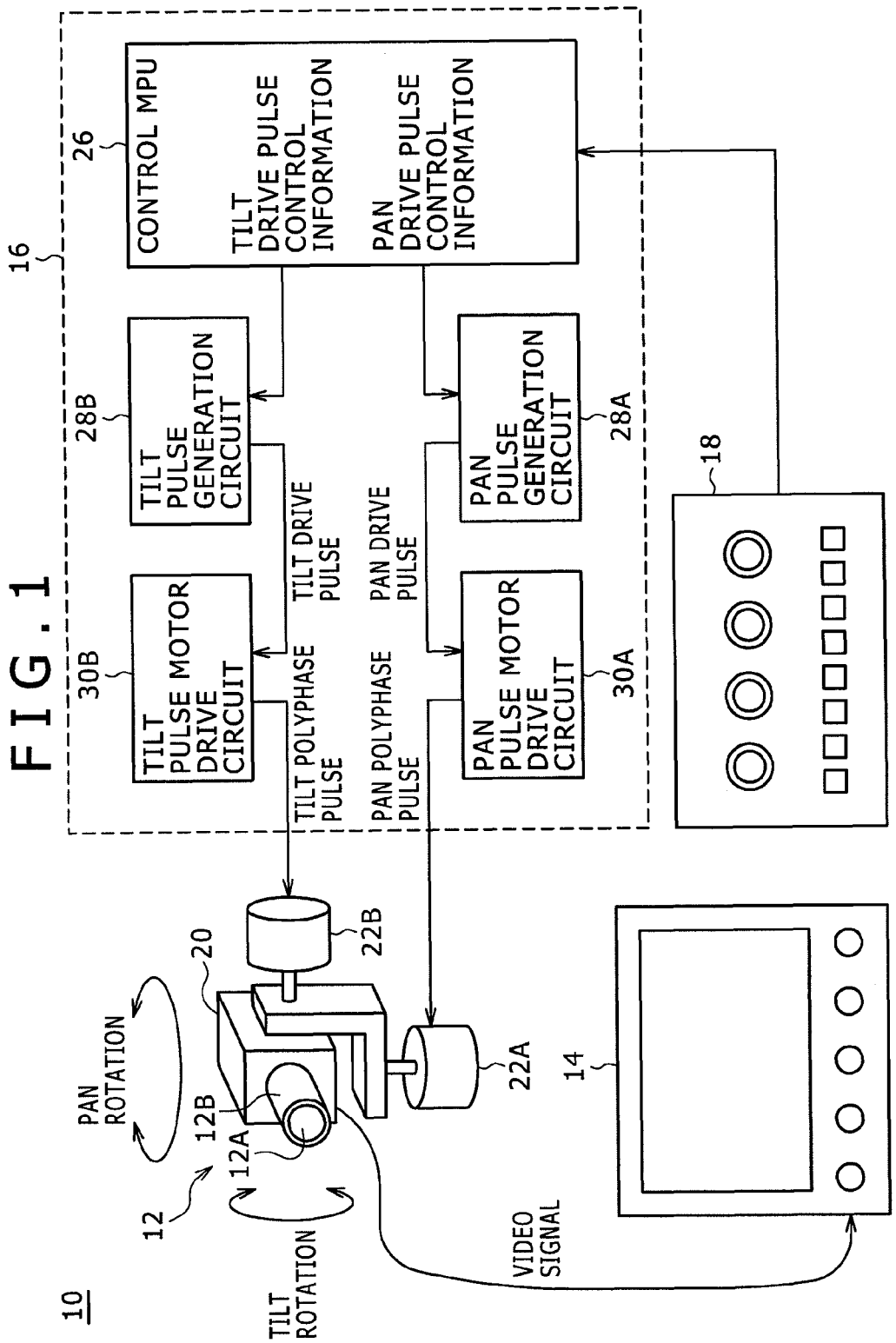
FIG. 1 is a block diagram showing the configuration of imaging apparatus.

FIG. 1 is a block diagram showing the configuration of imaging apparatus 10.

As shown in FIG. 1, the imaging apparatus 10 forms a surveillance camera system for monitoring an outdoor or indoor area. In the present embodiment, the imaging apparatus 10 includes a camera unit 12, a video monitor 14, the control device 16, and a system controller 18.

The camera unit 12 has a case (not shown) serving as its external package, and is used in such a manner as to be attached through the case to the wall of an outdoor column or building, or to an indoor ceiling or wall.

Inside the case, a video camera 20 provided with a lens barrel 12B having therein a photographic optical system 12A is housed. Provided in the video camera 20 are an imaging element (not shown) that captures a subject image formed by the photographic optical system 12A, a signal processor that executes signal processing for an imaging signal supplied from the imaging element to thereby produce a video signal, and so on.

The video camera 20 can swivel in the pan direction around a first virtual axis, and can swivel in the tilt direction around a second virtual axis perpendicular to the first virtual axis.

The rotational driving force of a pan pulse motor 22A is transmitted to the video camera 20 via a driving force transmission mechanism, so that the video camera 20 is swiveled in the pan direction. In addition, the rotational driving force of a tilt pulse motor 22B is transmitted to the video camera 20 via a driving force transmission mechanism, so that the video camera 20 is swiveled in the tilt direction. Any of various publicly-known mechanisms can be employed as the driving force transmission mechanism.

The video monitor 14 displays video based on the video signal supplied from the video camera 20.

The system controller 18 has plural operation parts such as operation switches and operation levers. In response to operation of these operation parts, the system controller 18 creates target position information and rotational speed information that specify the rotational positions and rotational speeds of the video camera 20 regarding the pan direction and the tilt direction, and supplies the created information to the control device 16.

The system controller 18 may be a unit that is not directly operated by a user but is formed of an upper-level host device or personal computer.

The control device 16 controls the rotation amounts and rotational speeds of the pan pulse motor 22A and the tilt pulse motor 22B to thereby control the rotation amounts and rotational speeds of the video camera 20 regarding the pan direction and the tilt direction.

In the present embodiment, the control device 16 includes a control micro processor unit (MPU) 26, a pan pulse generation circuit 28A, a pan pulse motor drive circuit 30A, a tilt pulse generation circuit 28B, and a tilt pulse motor drive circuit 30B.

The control MPU 26 decides the rotation amounts, rotational directions, and rotational speeds of the pan pulse motor 22A and the tilt pulse motor 22B based on the target position information and the rotational speed information supplied from the system controller 18. The control MPU 26 sequentially sends the decided parameters as pan drive pulse control information to the pan pulse generation circuit 28A, and as tilt drive pulse control information to the tilt pulse generation circuit 28B.

The control MPU 26 is formed of e.g. a microcomputer (one-chip microcomputer) in which a CPU, a ROM storing a control program and so on, a RAM offering a working area, and an interface unit serving as an interface with peripheral circuits are connected to each other by a bus. The control MPU 26 functions through execution of the control program by the CPU.

The pan pulse generation circuit 28A and the tilt pulse generation circuit 28B generate drive pulses with the cycles specified in the received control information, and supply the drive pulses to the pan pulse motor drive circuit 30A and the tilt pulse motor drive circuit 30B, respectively.

The pan pulse motor drive circuit 30A and the tilt pulse motor drive circuit 30B convert the supplied drive pulses to excitation currents (polyphase pulses) for actually driving the pulse motors 22A and 22B. The pan pulse motor drive circuit 30A and the tilt pulse motor drive circuit 30B supply these excitation currents to the pan pulse motor 22A and the tilt pulse motor 22B to thereby rotate the motors 22A and 22B.

In this configuration, by operating the operation parts of the system controller 18, a user can swivel the video camera 20 in the specified direction at the specified speed, and thereby can display desired video on the video monitor 14.

Next, the basic configuration of a control device 16 of the comparative example and the operation thereof will be described below.

Figure 4:
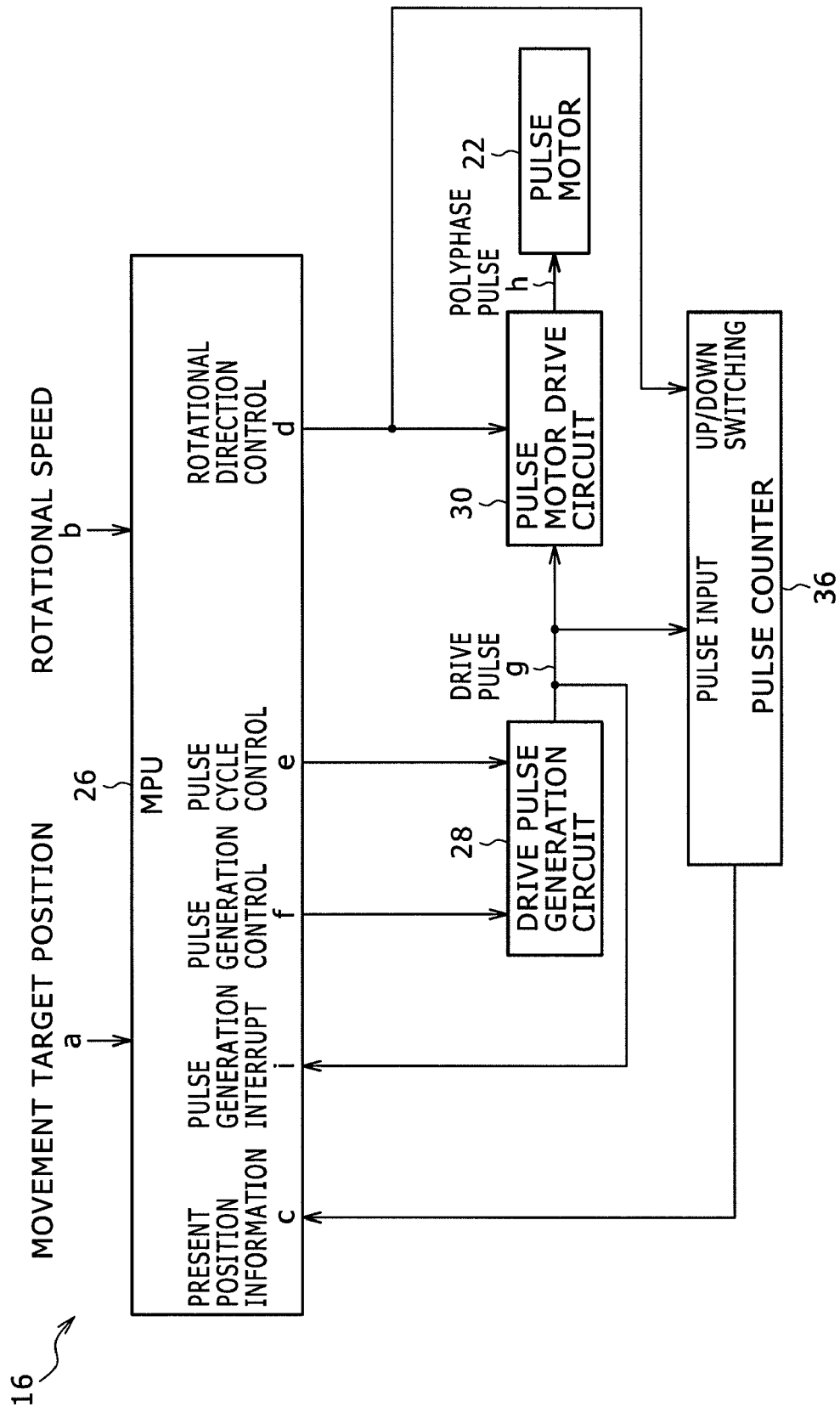
FIG. 4 is a block diagram showing the configuration of a control device of a comparative example.

FIG. 4 is a block diagram showing the configuration of the control device 16 of the comparative example.

In the actual control device 16, as shown in FIG. 1, the pan pulse generation circuit 28A and the pan pulse motor drive circuit 30A are provided corresponding to the pan pulse motor 22A, and the tilt pulse generation circuit 28B and the tilt pulse motor drive circuit 30B are provided corresponding to the tilt pulse motor 22B.

These two pulse generation circuits 28A and 28B have the same configuration, and two pulse motor drive circuits 30A and 30B also have the same configuration. Therefore, the following description is based on an assumption that the control device 16 is provided with one pulse motor 22, one pulse generation circuit 28, and one pulse motor drive circuit 30 for simplified description.

The control device 16 includes a pulse counter 36 in addition to the control MPU 26, the pulse generation circuit 28, and the pulse motor drive circuit 30.

The pulse generation circuit 28 generates a drive pulse g in accordance with the cycle set by the control MPU 26.

When the cycle set in the pulse generation circuit 28 is shorter, the number of drive pulses g generated per unit time is larger (the frequency of the drive pulse g is higher), and therefore the rotational speed of the pulse motor 22 is higher.

In contrast, when the cycle set in the pulse generation circuit 28 is longer, the number of drive pulses g generated per unit time is smaller (the frequency of the drive pulse g is lower), and therefore the rotational speed of the pulse motor 22 is lower.

The pulse generation circuit 28 starts/stops the generation of the drive pulse g in accordance with pulse generation control information f supplied from the control MPU 26.

Based on the drive pulse g supplied from the pulse generation circuit 28, the pulse motor drive circuit 30 generates an excitation current of the pattern corresponding to the number of division set in the pulse motor drive circuit 30 in advance, and supplies the excitation current to the pulse motor 22 to thereby drive the pulse motor 22 based on micro-step driving.

The number of division determines the number of micro-steps into which one step of the pulse motor 22 is divided for the driving of the pulse motor 22 by the micro-step driving.

For example, if the number of division is four, one step is divided into ¼ micro-steps. If the number of division is eight, one step is divided into ⅛ micro-steps. If the number of division is sixteen, one step is divided into ¹⁄₁₆ micro-steps.

The pulse motor drive circuit 30 generates the excitation current in such a way that the pulse motor 22 will be rotated in the forward or reverse direction in accordance with rotational direction control information d supplied from the control MPU 26.

The pulse counter 36 gives the control MPU 26 a count value obtained by counting the number of drive pulses g output from the pulse generation circuit 28, as present position information c indicating the rotational position of the pulse motor 22.

The control MPU 26 sets a pulse cycle e and gives it to the pulse generation circuit 28 every time the drive pulse g from the pulse generation circuit 28 is supplied to the control MPU 26.

The supply of the pulse cycle e to the pulse generation circuit 28 by the control MPU 26 is carried out through interrupt processing by the control MPU 26, activated by the control MPU 26 every time the drive pulse g is supplied to the control MPU 26 as a pulse generation interrupt signal i.

Figure 5:
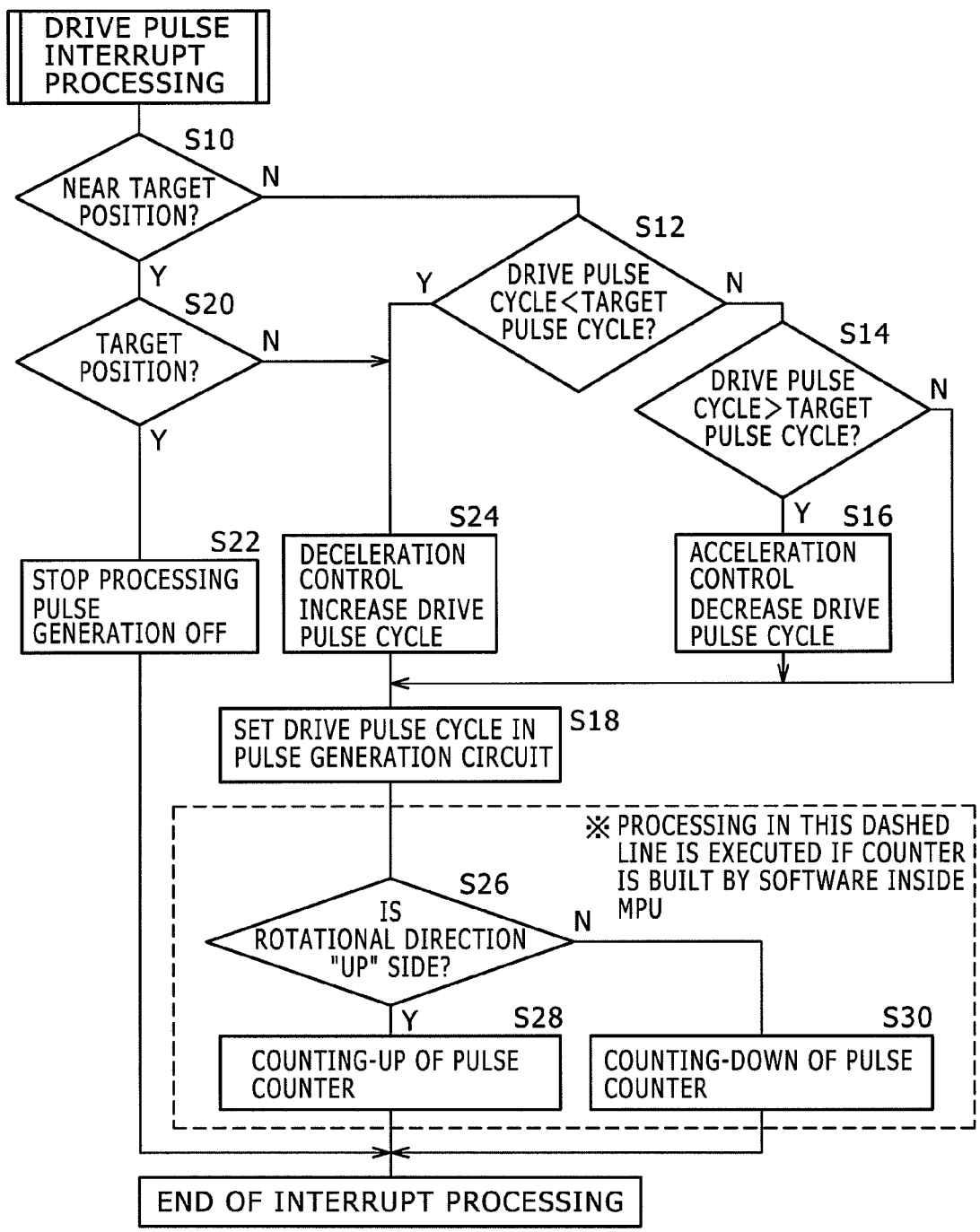
FIG. 5 is a flowchart showing the operation of the control device of the comparative example.

Next, the operation of the control device 16 of the comparative example will be described below with reference to FIG. 4 and the flowchart of FIG. 5.

As shown in FIG. 4, in response to operation of the operation parts of the system controller 18 (FIG. 1) by a user, the system controller 18 gives the control MPU 26 a movement target position a of the movement of the video camera 20 in the pan direction or the tilt direction and a rotational speed b of the movement of the video camera 20 in the pan direction or the tilt direction.

The control MPU 26 obtains the count value of the pulse counter 36 corresponding to the target position (hereinafter, referred to as a movement target position a') and the rotational direction d from the movement target position a given from the system controller 18 and the present position information c given from the pulse counter 36.

Furthermore, the control MPU 26 obtains the cycle of the drive pulse g necessary to achieve the rotational speed b (hereinafter, referred to as a target pulse cycle).

The control MPU 26 supplies the rotational direction d thus obtained to the pulse motor drive circuit 30, so that the rotational direction d of the pulse motor 22 is set in the pulse motor drive circuit 30.

Furthermore, the control MPU 26 supplies the rotational direction d to the pulse counter 36, so that UP/DOWN of the counting is set in the pulse counter 36. Specifically, setting is made as to whether the pulse counter 36 counts the drive pulses g in the adding manner or in the subtracting manner depending on the rotational direction d.

In the comparative example, the number of division per one step in the micro-step driving of the pulse motor 22 (or the micro-step value 1/1, ½, ¼ . . . ) is set as a fixed value in the pulse motor drive circuit 30.

The control MPU 26 sets the pulse cycle e in the pulse generation circuit 28 (the initial value is set longer than the target pulse cycle, in general) and turns on the pulse generation control information f.

The pulse generation circuit 28 outputs the drive pulse g to the pulse motor drive circuit 30.

The pulse motor drive circuit 30 converts the received drive pulse g to an excitation current h for driving the pulse motor 22, and supplies the excitation current h to the pulse motor 22. Due to this operation, the pulse motor 22 starts its rotation depending on the drive pulse g.

The drive pulse g from the pulse generation circuit 28 is supplied also to the pulse counter 36, so that the present position is updated through counting UP/DOWN.

The drive pulse g of the pulse generation circuit 28 is supplied also to the control MPU 26.

The drive pulse g is input to the control MPU 26 as the pulse generation interrupt signal i. This triggers the activation of the interrupt processing shown in the flowchart of FIG. 5 by the control MPU 26.

Specifically, the control MPU 26 determines whether or not the present position is near the target position based on the present position information c supplied from the pulse counter 36 (step S10).

If the determination in the step S10 results in "NO", it is determined whether or not the pulse cycle e is shorter than the target pulse cycle (step S12).

If the determination in the step S12 results in "NO", it is determined whether or not the pulse cycle e is longer than the target pulse cycle (step S14).

If the step S14 results in "YES", the pulse cycle e is decreased as acceleration control (step S16), and then the pulse cycle e is set in the pulse generation circuit 28 (step S18).

If the determination in the step S10 results in "YES", it is determined whether or not the present position has reached the target position (step S20).

If the determination in the step S20 results in "YES", the pulse generation control information f to the pulse generation circuit 28 is turned off (step S22), so that the processing is ended.

If the step S12 results in "YES" (the state in which the rotational speed has surpassed the target speed due to any cause) or the step S20 results in "NO" (the state in which the present position is coming very close to the target position), the pulse cycle e is increased as deceleration control (step S24), and then the pulse cycle e is set in the pulse generation circuit 28 (step S18).

If the step S14 results in "NO", the pulse cycle e is equal to the target pulse cycle, and therefore the pulse cycle e is set in the pulse generation circuit 28 as it is without change (step S18).

A step S26 and the subsequent steps correspond to the operation of the pulse counter 36. Specifically, it is determined whether or not the rotational direction control information d corresponds to the "UP" side (step S26). If the step S26 results in "YES", the counting-UP of the pulse counter 36 is carried out (step S28). If the step S26 results in "NO", the counting-DOWN of the pulse counter 36 is carried out (step S30).

Through the above-described steps, one time of the interrupt processing is ended.

That is, in the interrupt processing, the control MPU 26 obtains the cycle of the drive pulse g that should be generated by the pulse generation circuit 28 and sets the obtained cycle in the pulse generation circuit 28 as the pulse cycle e.

The control MPU 26 gradually decreases the pulse cycle e that is to be set in the pulse generation circuit 28 toward the target pulse cycle, which allows the acceleration control of the pulse motor 22.

Furthermore, in the interrupt processing, the control MPU 26 acquires the present position information c from the pulse counter 36, and starts the deceleration control if the present position has reached the vicinity of the movement target position a'. For the deceleration control, the pulse cycle e to be set in the pulse generation circuit 28 is gradually increased contrary to the acceleration control.

In addition, the deceleration control is carried out also when the present rotational speed is higher than the target speed due to any cause, i.e., when the pulse cycle e is shorter than the target pulse cycle.

Moreover, in the interrupt processing, if the present position information c acquired from the pulse counter 36 matches the movement target position a', the control MPU 26 turns off the pulse generation control information f to the pulse generation circuit 28 to thereby stop the rotation of the pulse motor 22.

Through the above-described processing, the pulse motor 22 is rotated at the rotational speed specified by the rotational speed b, so that the movement (swiveling in the pan direction or in the tilt direction) of the video camera 20 to the target position indicated by the movement target position a is completed.

In such a comparative example, a micro-step drive system in which the number of division is large (e.g., the micro-step value is 1/16) can be designed for the pulse motor drive circuit 30 with emphasis on smoothness of the low-speed rotation of the pulse motor 22. However, in this case, to obtain the same rotational speed as that in normal driving (the micro-step value is 1/1) for the high-speed rotation of the pulse motor 22, the drive pulses g whose number is sixteen times that at the time of the low-speed rotation are required per unit time.

Therefore, the number of times of the occurrence of the interrupt by the control MPU 26 per unit time also becomes sixteen times, and thus the control MPU 26 needs to execute the predetermined processing within an extremely-short interrupt cycle.

In general, the processing ability of an embedded microcomputer serving as the control MPU 26 is not so high. Therefore, there is a fear that it is difficult to rotate the pulse motor 22 at high speed because the processing ability of the microcomputer acts as a bottleneck.

To address this problem, in the present embodiment, at the time of the low-speed rotation of the pulse motor 22, the number of division of micro-step driving is set large to thereby realize smooth low-speed rotation of the pulse motor 22. At the time of high-speed rotation, the number of division is set small to thereby realize alert high-speed rotation of the pulse motor 22 while suppressing increase in the number of drive pulses g generated per unit time.

The configuration and operation of the control device 16 of the present embodiment will be described in detail below.

Figure 2:
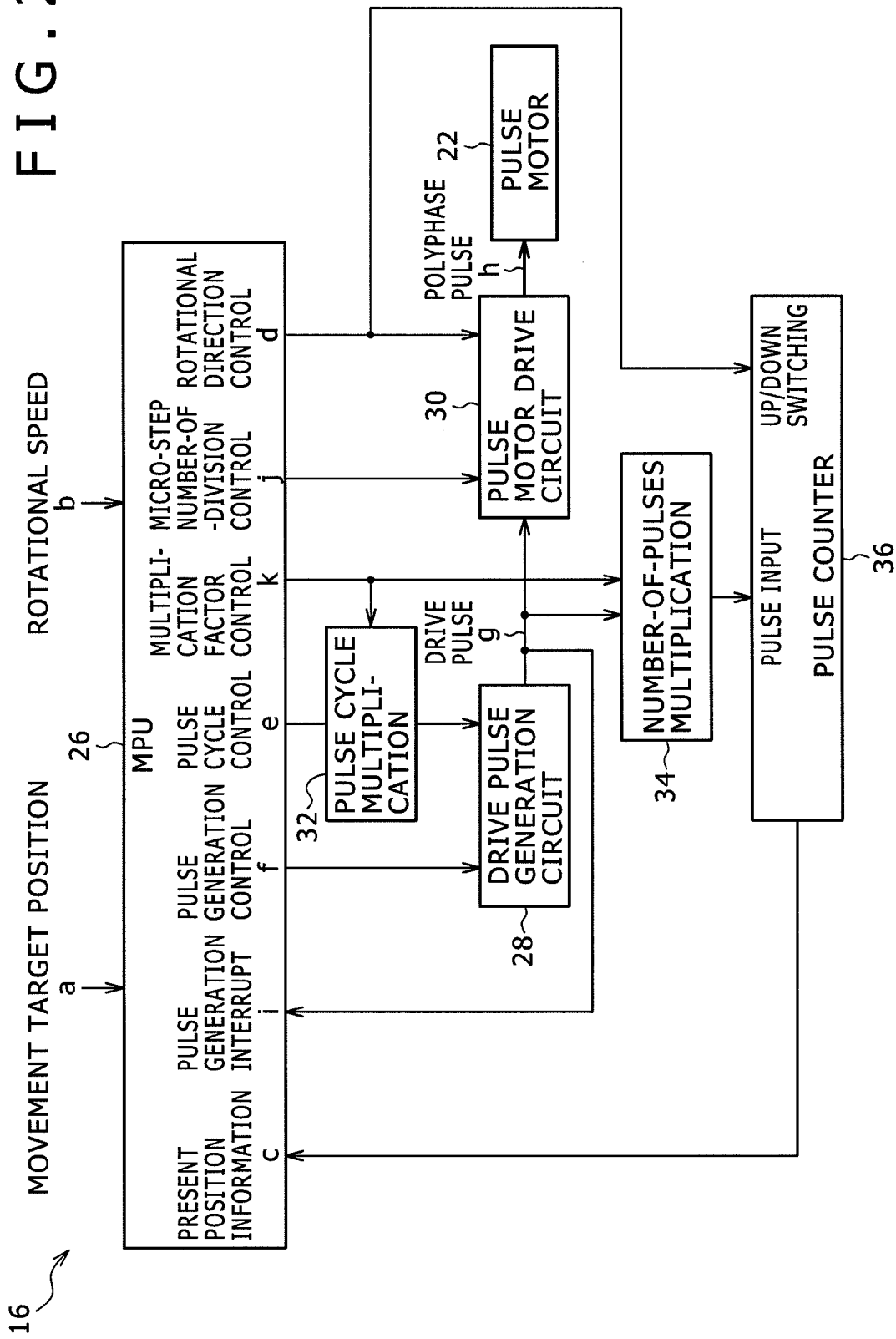
FIG. 2 is a block diagram showing the configuration of a control device according to an embodiment of the present invention.

FIG. 2 is a block diagram showing the configuration of the control device 16 of the present embodiment. For the following description, the same parts as those in FIG. 4 are given the same numerals and symbols for simplified explanation.

The control device 16 includes a control MPU 26 (equivalent to the controller in the claims), a pulse generation circuit 28 (equivalent to the drive pulse generator in the claims), a pulse motor drive circuit 30 (equivalent to the pulse motor driver in the claims), a pulse cycle multiplier 32 (equivalent to the cycle multiplier in the claims), a number-of-pulses multiplier 34 (equivalent to the drive pulse multiplier in the claims), and a pulse counter 36.

The pulse generation circuit 28 generates a drive pulse g in accordance with a pulse cycle e set by the control MPU 26. In the present embodiment, the pulse cycle e supplied from the control MPU 26 to the pulse cycle multiplier 32 to be described later is multiplied by the pulse cycle multiplier 32, so that the multiplied pulse cycle e is set in the pulse generation circuit 28.

When the pulse cycle e set in the pulse generation circuit 28 is shorter, the number of drive pulses g generated per unit time is larger (the frequency of the drive pulse g is higher), and therefore the rotational speed of the pulse motor 22 is higher.

In contrast, when the pulse cycle e set in the pulse generation circuit 28 is longer, the number of drive pulses g generated per unit time is smaller (the frequency of the drive pulse g is lower), and therefore the rotational speed of the pulse motor 22 is lower.

The pulse generation circuit 28 starts/stops the generation of the drive pulse g in accordance with ON/OFF of pulse generation control information f supplied from the control MPU 26.

Based on the drive pulse g supplied from the pulse generation circuit 28, the pulse motor drive circuit 30 generates an excitation current of the pattern corresponding to the number of division set in the pulse motor drive circuit 30, and supplies the excitation current to the pulse motor 22 to thereby drive the pulse motor 22 based on micro-step driving.

In the present embodiment, the setting of the number of division in the pulse motor drive circuit 30 is carried out through the supply of a micro-step number-of-division control signal j for the setting of the number of division from the control MPU 26 to an input terminal (referred to generally as a step-angle setting input terminal) of the pulse motor drive circuit 30.

A larger number of division (smaller micro-step value) leads to a smaller rotation amount of the pulse motor 22 per one drive pulse g, and therefore is advantageous in smooth low-speed rotation of the pulse motor 22.

In contrast, a smaller number of division (larger micro-step value) leads to a larger rotation amount of the pulse motor 22 per one drive pulse g, and therefore is advantageous in alert high-speed rotation of the pulse motor 22.

Therefore, the following operation way is possible. Specifically, at the time of the low-speed rotation of the pulse motor 22, the pulse motor 22 is driven with e.g. ⅛ micro-steps corresponding to a large number of division. Subsequently, the cycle of the drive pulse g is gradually shortened along with acceleration control, and immediately before the cycle length reaches the lower limit in terms of the speed of the interrupt processing of the control MPU 26, the micro-step drive system of the pulse motor drive circuit 30 is switched to ¼ micro-steps corresponding to a smaller number of division by using the micro-step number-of-division control signal j.

Due to this operation, even when the cycle of the drive pulse g is set twice that before the switching of the number of division, the same rotational speed as that before the switching of the number of division is obtained, which makes the processing of the control MPU 26 easier. Thus, the present embodiment is advantageous in the continuation of the acceleration to a higher-speed range of the rotation.

The pulse motor drive circuit 30 generates the excitation current in such a way that the pulse motor 22 will be rotated in the forward or reverse direction in accordance with rotational direction control information d supplied from the control MPU 26.

The pulse counter 36 gives the control MPU 26 a count value obtained by counting the number of drive pulses g output from the pulse generation circuit 28, as present position information c indicating the rotational position of the pulse motor 22. In the present embodiment, the drive pulse g supplied from the pulse generation circuit 28 to the number-of-pulses multiplier 34 to be described later is multiplied by the number-of-pulses multiplier 34, so that the multiplied drive pulse g is supplied to the pulse counter 36.

The pulse cycle multiplier 32 and the number-of-pulses multiplier 34 are provided to ensure consistency of the operation of the respective units when the micro-step drive system of the pulse motor drive circuit 30 is switched by the control MPU 26.

The pulse cycle multiplier 32 multiplies the pulse cycle e supplied from the control MPU 26 based on a multiplication factor k set by the control MPU 26, and sets the multiplied pulse cycle e in the pulse generation circuit 28.

The number-of-pulses multiplier 34 multiplies the drive pulse g supplied from the pulse generation circuit 28 based on the multiplication factor k set by the control MPU 26, and supplies the multiplied drive pulse g to the pulse counter 36.

The control MPU 26 sets the pulse cycle e for the pulse generation circuit 28 every time the drive pulse g from the pulse generation circuit 28 is supplied to the control MPU 26.

In the present embodiment, the supply of the pulse cycle e to the pulse generation circuit 28 by the control MPU 26 is carried out through interrupt processing by the control MPU 26, activated by the control MPU 26 every time the drive pulse g is supplied to the control MPU 26 as a pulse generation interrupt signal i.

The control MPU 26 switches the number of division between a first number of division N and a second number of division M smaller than the first number of division N, and sets the number of division in the pulse motor drive circuit 30.

As an example of the present embodiment, the case in which the first number of division N is eight (i.e., one step is divided into ⅛ micro-steps) and the second number of division M is four (i.e., one step is divided into ¼ micro-steps) will be described below.

In the following, the operation of the respective units will be described in such a way that the drive pulse g employed when the pulse motor 22 is driven in the state in which the first number of division N (>the second number of division M) is set in the pulse motor drive circuit 30 is regarded as the basis.

In other words, in the following description, the number of drive pulses in the case of the most-segmented micro-step drive system (⅛ micro-steps, in the present embodiment) is regarded as the basis.

The control MPU 26 sets the multiplication factor k in the pulse cycle multiplier 32 and the number-of-pulses multiplier 34.

Specifically, the setting of the multiplication factor k of the pulse cycle e in the pulse cycle multiplier 32 by the control MPU 26 is so carried out that the pulse cycle e set in the drive pulse generation circuit 28 in the state in which the second number of division M is set in the pulse motor drive circuit 30 becomes N/M times the pulse cycle e set in the drive pulse generation circuit 28 in the state in which the first number of division N is set in the pulse motor drive circuit 30.

In other words, the pulse cycle e is so multiplied by the pulse cycle multiplier 32 that the pulse cycle e set in the drive pulse generation circuit 28 in the state in which the second number of division M is set in the pulse motor drive circuit 30 becomes N/M times the pulse cycle e set in the drive pulse generation circuit 28 in the state in which the first number of division N is set in the pulse motor drive circuit 30.

More specifically, because the first number of division N is eight and the second number of division M is four, the pulse cycle e is so multiplied by the pulse cycle multiplier 32 that the pulse cycle e set in the drive pulse generation circuit 28 in the state in which the second number of division M=4 is set in the pulse motor drive circuit 30 becomes N/M=2 times the pulse cycle e set in the drive pulse generation circuit 28 in the state in which the first number of division N=8 is set in the pulse motor drive circuit 30.

Furthermore, the setting of the multiplication factor k of the drive pulse g in the number-of-pulses multiplier 34 by the control MPU 26 is so carried out that the drive pulse g supplied to the pulse counter 36 in the state in which the second number of division M is set in the pulse motor drive circuit 30 becomes N/M times the drive pulse g supplied to the pulse counter 36 in the state in which the first number of division N is set in the pulse motor drive circuit 30.

In other words, the drive pulse g is so multiplied by the number-of-pulses multiplier 34 that the drive pulse g supplied to the pulse counter 36 in the state in which the second number of division M is set in the pulse motor drive circuit 30 becomes N/M times the drive pulse g supplied to the pulse counter 36 in the state in which the first number of division N is set in the pulse motor drive circuit 30.

Specifically, because the first number of division N is eight and the second number of division M is four, the drive pulse g is so multiplied by the number-of-pulses multiplier 34 that the drive pulse g supplied to the pulse counter 36 in the state in which the second number of division M=4 is set in the pulse motor drive circuit 30 becomes N/M=2 times the drive pulse g supplied to the pulse counter 36 in the state in which the first number of division N=8 is set in the pulse motor drive circuit 30.

Consequently, the multiplication factor k set in the pulse cycle multiplier 32 and the number-of-pulses multiplier 34 by the control MPU 26 has the following values if the state in which the first number of division N=8 is set in the pulse motor drive circuit 30 is regarded as the basis: the multiplication factor k=1 when the first number of division N=8 is set in the pulse motor drive circuit 30; and the multiplication factor k=2 when the second number of division M=4 is set in the pulse motor drive circuit 30.

Next, the operation of the control device 16 will be described below with reference to FIG. 2 and the flowchart of FIG. 3.

Similarly to the comparative example, the system controller 18 (FIG. 1) gives the control MPU 26 a movement target position a indicating the target position to which the video camera 20 should move in the pan direction or the tilt direction and a rotational speed b indicating the rotational speed of the movement of the video camera 20 in the pan direction or the tilt direction. The control MPU 26 obtains a movement target position a' and a target pulse cycle from the movement target position a and present position information c.

In addition, similarly to the comparative example, the control MPU 26 gives a rotational direction d to the pulse motor drive circuit 30, so that the rotational direction d of the pulse motor 22 is set in the pulse motor drive circuit 30. The control MPU 26 gives the rotational direction d also to the pulse counter 36, so that setting as to counting UP/DOWN is made for the pulse counter 36.

The pulse generation circuit 28 outputs the drive pulse g to the pulse motor drive circuit 30.

The pulse motor drive circuit 30 converts the received drive pulse g to an excitation current h for driving the pulse motor 22, and supplies the excitation current h to the pulse motor 22. Due to this operation, the pulse motor 22 starts its rotation depending on the drive pulse g.

The drive pulse g from the pulse generation circuit 28 is multiplied by the number-of-pulses multiplier 34 and supplied to the pulse counter 36, so that the present position is updated through counting UP/DOWN.

The drive pulse g of the pulse generation circuit 28 is supplied also to the control MPU 26.

The drive pulse g is input to the control MPU 26 as the pulse generation interrupt signal i. This triggers the activation of the interrupt processing shown in the flowchart of FIG. 3 by the control MPU 26.

Specifically, upon the supply of the movement target position a and the rotational speed b to the control MPU 26, the control MPU 26 executes the same processing as that in the above-described comparative example: the control MPU 26 activates the pulse motor 22 from the stopped state so that the pulse motor 22 may start its rotation with ⅛ micro-steps, which provide smooth low-speed rotation, and carries out acceleration toward the target speed.

More specifically, at the time of the start of the rotation of the pulse motor 22, the control MPU 26 sets the first number of division N=8 in the pulse motor drive circuit 30 by using the micro-step number-of-division control signal j. Furthermore, the control MPU 26 sets the multiplication factor k=1 in the pulse cycle multiplier 32 and the number-of-pulses multiplier 34.

The acceleration is carried out through the gradual decreasing of the pulse cycle e similarly to the normal system.

A description with reference to FIG. 3 will be made below. The control MPU 26 determines whether or not the present position is near the target position based on the present position information c supplied from the pulse counter 36 (step S40).

If the determination in the step S40 results in "NO", it is determined whether or not the pulse cycle e (drive pulse cycle) is shorter than the target pulse cycle (step S42).

If the step S42 results in "NO", it is determined whether or not the pulse cycle e is longer than the target pulse cycle (step S44).

If the step S44 results in "YES", the pulse cycle e is decreased as acceleration control (step S46).

The continuation of the acceleration shortens the pulse cycle e, which possibly causes a trouble that the processing of the control MPU 26 can not be completed within the interrupt cycle, in the case of the ⅛ micro-steps.

To avoid this problem, a determination is made as to the necessity of switching of the drive system from the ⅛ micro-steps to the ¼ micro-steps.

Figure 3:
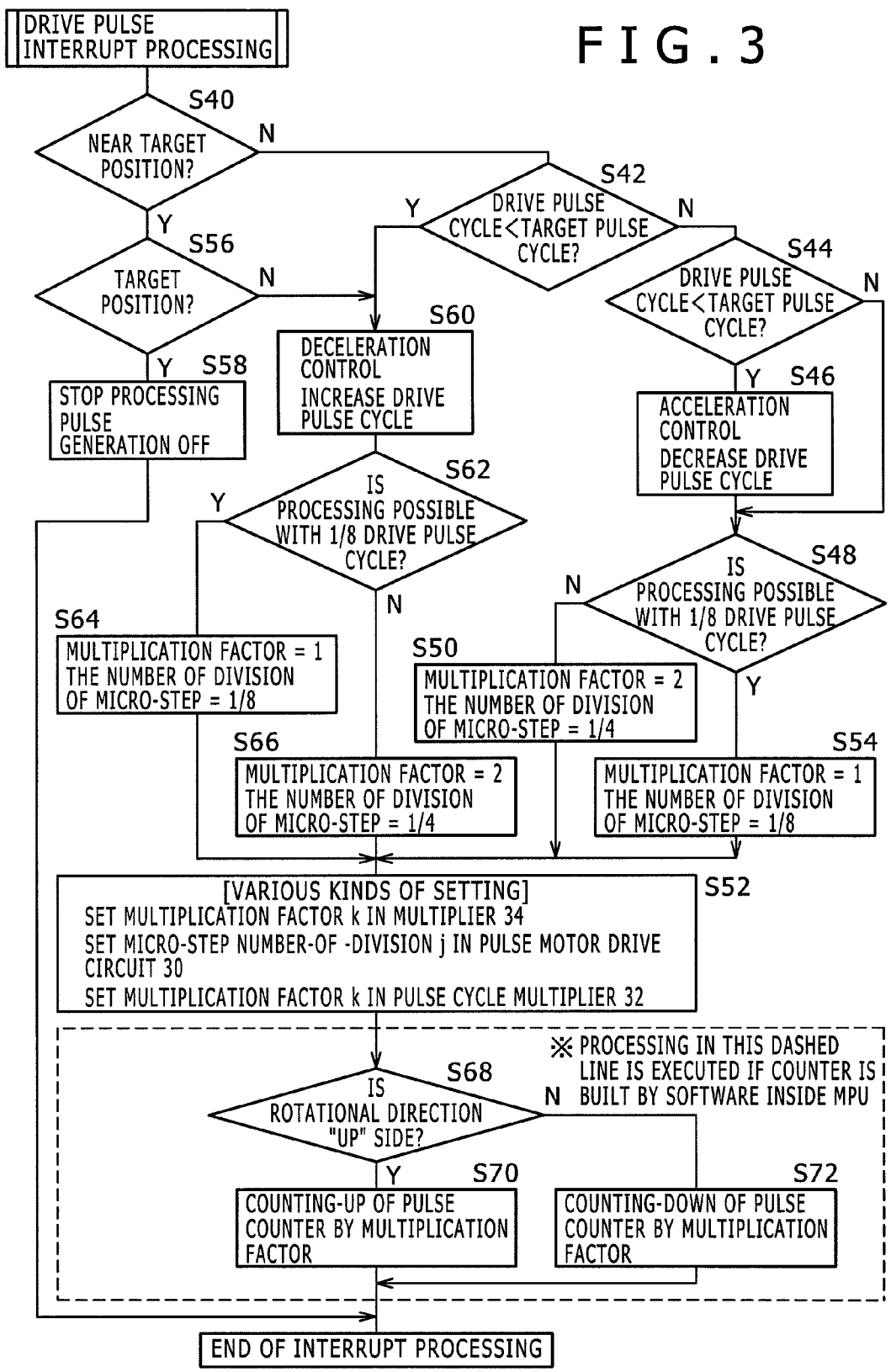
FIG. 3 is a flowchart showing the operation of the control device according to the embodiment.

Specifically, referring to FIG. 3, it is determined whether or not the control MPU 26 can execute the processing with the pulse cycle e for the ⅛ micro-steps (step S48).

If the step S48 results in "NO", switching of the drive system from the ⅛ micro-steps to the ¼ micro-steps is decided.

Specifically, it is decided that the multiplication factor k will be set to two and the number of division will be set to the second number of division M=4 (the ¼ micro-steps will be employed for the micro-step driving) (step S50). Subsequently, the decided multiplication factor k is set in the pulse cycle multiplier 32 and the number-of-pulses multiplier 34, and the micro-step number-of-division control signal j for setting the number of division is supplied to the pulse motor drive circuit 30 (step S52).

In other words, if the drive system is switched to the ¼ micro-steps in the acceleration with the ⅛ micro-steps, one pulse of the drive pulse g corresponding to the ¼ micro-step and two pulses of the drive pulse g corresponding to the ⅛ micro-step provide the equal rotation angle of the pulse motor 22.

Thus, the ratio (¼)/(⅛) of the micro-steps is set in the pulse cycle multiplier 32 and the number-of-pulses multiplier 34 as the multiplication factor k.

In contrast, if the step S48 results in "YES", i.e., if the processing ability of the control MPU 26 will have a margin even when the acceleration with the ⅛ micro-steps will be continued, it is decided that the number of division will be set to the first number of division N=8 (the ⅛ micro-steps will be employed as the micro-step drive system), and the multiplication factor k will be set to one (the present condition is maintained) (step S54). Subsequently, the decided multiplication factor k is set in the pulse cycle multiplier 32 and the number-of-pulses multiplier 34, and the micro-step number-of-steps control signal j for setting the number of division is supplied to the pulse motor drive circuit 30 (step S52).

If the determination in the step S40 results in "YES", it is determined whether or not the present position has reached the target position (step S56).

If the determination in the step S56 results in "YES", the pulse generation control information f to the pulse generation circuit 28 is turned off (step S58), so that the processing is ended.

If the step S42 results in "YES" (the state in which the rotational speed has surpassed the target speed due to any cause) or the step S56 results in "NO" (the state in which the present position is coming very close to the target position), the pulse cycle e is increased as deceleration control (step S60).

The continuation of the deceleration processing extends the pulse cycle e, which possibly causes a situation in which the processing of the control MPU 26 is possible even if the drive system is switched to the ⅛ micro-steps before long and thus the pulse cycle e is halved.

Therefore, whether or not to switch the drive system from the ¼ micro-steps to the ⅛ micro-steps is determined.

In general, in order to stabilize the operation of the switching of the drive system, the cycle (timing) of the drive system switching at the time of acceleration is shifted from the cycle (timing) of the drive system switching at the time of deceleration.

This switching operation will be described with FIG. 3. Specifically, it is determined whether or not the control MPU 26 can execute the processing with the pulse cycle e for the ⅛ micro-steps (step S62).

If the step S62 results in "YES", switching of the drive system from the ¼ micro-steps to the ⅛ micro-steps is decided.

Specifically, it is decided that the multiplication factor k will be set to one and the number of division will be set to the first number of division N=8 (the ⅛ micro-steps will be employed for the micro-step driving) (step S64). Subsequently, the decided multiplication factor k is set in the pulse cycle multiplier 32 and the number-of-pulses multiplier 34, and the micro-step number-of-division control signal j for setting the number of division is supplied to the pulse motor drive circuit 30 (step S52).

In other words, if the drive system is switched to the ⅛ micro-steps in the deceleration with the ¼ micro-steps, one pulse of the drive pulse g corresponding to the ¼ micro-step and two pulses of the drive pulse g corresponding to the ⅛ micro-step provide the equal rotation angle of the pulse motor 22.

Thus, the ratio (¼)/(⅛) of the micro-steps is set in the pulse cycle multiplier 32 and the number-of-pulses multiplier 34 as the multiplication factor k.

In contrast, if the step S62 results in "NO", i.e., if the processing ability of the control MPU 26 will become insufficient in response to the switching to the deceleration with the ⅛ micro-steps, it is decided that the number of division will be set to the second number of division M=4 (the ¼ micro-steps will be employed as the micro-step drive system), and the multiplication factor k will be set to two (the present condition is maintained) (step S66). Subsequently, the decided multiplication factor k is set in the pulse cycle multiplier 32 and the number-of-pulses multiplier 34, and the micro-step number-of-steps control signal j for setting the number of division is supplied to the pulse motor drive circuit 30 (step S52).

A step S68 and the subsequent steps correspond to the operation of the pulse counter 36. Specifically, it is determined whether or not the rotational direction control information d corresponds to the "UP" side (step S68). If the step S68 results in "YES", the counting-UP of the pulse counter 36 is carried out (step S70). If the step S68 results in "NO", the counting-DOWN of the pulse counter 36 is carried out (step S72).

Through the above-described steps, one time of the interrupt processing is ended.

In the present embodiment, the steps S46 and S60 are equivalent to the step of setting the cycle, in the claims.

The steps S50, S52, S54, S64, and S66 are equivalent to the step of switching the number of division and the step of multiplying the cycle, in the claims.

The operation of the number-of-pulses multiplier 34 will be further described. The pulse counter 36 counts the present position c on the basis of the drive pulse g output when the ⅛ micro-steps are employed. Therefore, when the ¼ micro-steps are employed, the pulse counter 36 carries out the operation of the counting-UP/DOWN two times per one pulse of the drive pulse g because the multiplication factor k=2 is set in the number-of-pulses multiplier 34.

This allows the continuation of the counting of the correct present position c in the ⅛ micro-step basis.

The operation of the pulse cycle multiplier 32 will be further described. When the ¼ micro-steps are employed, upon receiving the pulse cycle e output from the control MPU 26, the pulse cycle multiplier 32 sets the doubled pulse cycle e in the pulse generation circuit 28 because the multiplication factor k=2 is set therein.

When the ¼ micro-steps are employed, one pulse of the drive pulse g provides the same rotation angle as that obtained by two pulses of the drive pulse g when the ⅛ micro-steps are employed. Therefore, to keep the same speed after the switching to the ¼ micro-steps, the number of drive pulses g per unit time is decreased to half that when the ⅛ micro-steps are employed. That is, the pulse cycle e to be set in the drive pulse generation circuit 28 is doubled.

Through the above-described processing, the movement to the movement target position a at the rotational speed b in the present embodiment is completed.

According to the present embodiment, in the configuration in which the control MPU 26 sets the pulse cycle e in the drive pulse generation circuit 28 every time the drive pulse g is supplied from the drive pulse generation circuit 28, the number of division is switched between the first number of division N and the second number of division M smaller than the first number of division N, and set in the pulse motor drive circuit 30. Furthermore, the pulse cycle multiplier 32 that multiplies the pulse cycle e to be set in the drive pulse generation circuit 28 is provided. The multiplication of the pulse cycle e by the pulse cycle multiplier 32 is so carried out that the pulse cycle e set in the drive pulse generation circuit 28 in the state in which the second number of division M is set in the pulse motor drive circuit 30 becomes N/M times the pulse cycle e set in the drive pulse generation circuit 28 in the state in which the first number of division N is set in the pulse motor drive circuit 30.

Thus, at the time of low-speed rotation, smooth low-speed rotation can be realized by setting the first number of division N in the pulse motor drive circuit 30. At the time of high-speed rotation, alert high-speed rotation can be realized by setting the second number of division M smaller than the first number of division N in the pulse motor drive circuit 30. Furthermore, the number of drive pulses g generated per unit time can be suppressed through the switching between the first number of division N and the second number of division M. Therefore, the configuration of the embodiment is advantageous in reducing the burden of generation and control of the drive pulse g.

In addition, the pulse cycle e to be set in the drive pulse generation circuit 28 is multiplied by the pulse cycle multiplier 32 in accordance with the switching between the first number of division N and the second number of division M. Therefore, the configuration of the embodiment is advantageous in setting the proper pulse cycle e in the drive pulse generation circuit 28 irrespective of a change in the number of division of the micro-step drive system for the pulse motor 22.

In particular, due to enhancement in the image quality and increase in the number of pixels for camera units in surveillance camera systems and television conference systems, smooth rotation operation is required at the time of low-speed rotation for swiveling operation in the pan direction and the tilt direction. However, the present embodiment allows smooth and high-speed rotational driving for the swiveling of the camera unit at a speed in the range from low speed to high speed, and thus is advantageous in enhancement in the performance of surveillance camera systems and television conference systems.

Furthermore, the present embodiment reduces the burden on the control MPU 26 and thus allows cost reduction of the control MPU 26. Therefore, the embodiment is advantageous in achievement of cost reduction of the control device 16 and hence cost reduction of surveillance camera systems and television conference systems.

Moreover, in the present embodiment, the number-of-pulses multiplier 34 that multiplies the drive pulse g to be counted by the pulse counter 36 is provided, and the drive pulse g to be supplied to the pulse counter 36 is multiplied in accordance with the switching between the first number of division N and the second number of division M. This allows correct counting by the pulse counter 36 irrespective of a change in the number of division of the micro-step drive system for the pulse motor 22. Therefore, the configuration of the embodiment is advantageous in achievement of the correct present position information c of the pulse motor 22.

Furthermore, units provided in the related-art control device 16 can be used for the configuration of the present embodiment except for the pulse cycle multiplier 32 and the number-of-pulses multiplier 34. Therefore, the embodiment is advantageous in simplification of the configuration and suppression of the cost increase.

In addition, it is obvious that the pulse cycle multiplier 32, the number-of-pulses multiplier 34, and the pulse counter 36 can be built by software inside the control MPU 26. In this case, addition of hardware is hardly needed, which is more advantageous in simplification of the configuration and suppression of the cost increase.

In the above-described embodiment, the number of division to be set in the pulse motor drive circuit 30 is switched between two values: the first number of division N and the second number of division M smaller than the first number of division N. However, it should be obvious that the number of division to be set in the pulse motor drive circuit 30 may be switched between three or more values.

For example, multistage switching of the micro-step drive system for the pulse motor 22 may be carried out into e.g. ⅛ micro-steps, ¼ micro-steps, ½ micro-steps, and 1/1 micro-steps. In this case, it is possible to widen the speed range of the pulse motor 22 while reducing the burden of generation and control of the drive pulse, which is more advantageous in ensuring both smooth low-speed rotation and alert high-speed rotation by the pulse motor.

Furthermore, in the above-described embodiment, the drive pulse g is multiplied by the number-of-pulses multiplier 34 and then is counted by the pulse counter 36 in order to obtain the present position information c of the pulse motor 22. However, instead of the pulse counter 36 and the number-of-pulses multiplier 34, an encoder for detecting the rotation amount of the pulse motor 22 may be provided.

In the above-described embodiment, the control device 16 is applied to the imaging apparatus 10. However, the application target of the control device 16 is not limited to the imaging apparatus 10, but the control device 16 can be widely applied to various devices employing a pulse motor.

Furthermore, in the above-described embodiment, the imaging apparatus 10 is used for a surveillance system. However, it should be obvious that the imaging apparatus 10 may be used also for a television conference system and a remote control camera.

It should be understood by those skilled in the art that various modifications, combinations, sub-combinations and alterations may occur depending on design requirements and other factors insofar as they are within the scope of the appended claims or the equivalents thereof.

What is claimed is:

1. A pulse motor control device comprising:
   a drive pulse generator configured to generate a drive pulse in accordance with a set cycle;
   a pulse motor driver configured to generate an excitation current of a pattern corresponding to the number of division per one step of a pulse motor based on the drive pulse supplied from the drive pulse generator, the number of division being set in the pulse motor driver, the pulse motor driver supplying the excitation current to the pulse motor to thereby drive the pulse motor based on micro-step driving; and
   a controller configured to set the cycle in the drive pulse generator every time the drive pulse is supplied from the drive pulse generator, wherein
   the controller switches the number of division between a first number of division N and a second number of division M smaller than the first number of division N, and sets the number of division in the pulse motor driver,
   a cycle multiplier configured to multiply the cycle that is to be set in the drive pulse generator by the controller is provided, and
   multiplication of the cycle by the cycle multiplier is so carried out that the cycle set in the drive pulse generator in a state in which the second number of division M is set in the pulse motor driver becomes N/M times the cycle set in the drive pulse generator in a state in which the first number of division N is set in the pulse motor driver.

2. The pulse motor control device according to claim 1, further comprising:
   a pulse counter configured to supply, to the controller, a count value obtained by counting the drive pulse supplied from the drive pulse generator as position information indicating a rotational position of the pulse motor; and
   a drive pulse multiplier configured to multiply the drive pulse that is to be counted by the pulse counter, wherein
   multiplication of the drive pulse by the drive pulse multiplier is so carried out that the drive pulse supplied to the pulse counter in a state in which the second number of division M is set in the pulse motor driver becomes N/M times the drive pulse supplied to the pulse counter in a state in which the first number of division N is set in the pulse motor driver.

3. The pulse motor control device according to claim 1, wherein
   the controller is formed of a microcomputer, and
   setting of the cycle in the drive pulse generator by the controller is carried out through interrupt processing that is activated by the controller every time the drive pulse is supplied from the drive pulse generator to the controller.

4. A control method for a pulse motor for which a drive pulse generator and a pulse motor driver are provided, the drive pulse generator generating a drive pulse in accordance with a set cycle, the pulse motor driver generating an excitation current of a pattern corresponding to the number of division per one step of the pulse motor based on the drive pulse supplied from the drive pulse generator, the number of division being set in the pulse motor driver, the pulse motor driver supplying the excitation current to the pulse motor to thereby drive the pulse motor based on micro-step driving, the method comprising the steps of:
   setting the cycle in the drive pulse generator every time the drive pulse is supplied from the drive pulse generator;
   switching the number of division between a first number of division N and a second number of division M smaller than the first number of division N and setting the number of division in the pulse motor driver; and
   multiplying the cycle that is to be set in the drive pulse generator in such a way that the cycle set in the drive pulse generator in a state in which the second number of division M is set in the pulse motor driver becomes N/M times the cycle set in the drive pulse generator in a state in which the first number of division N is set in the pulse motor driver.

5. A control program for controlling a control device for a pulse motor, the control device including a drive pulse generator, a pulse motor driver, and a controller, the drive pulse generator generating a drive pulse in accordance with a set cycle, the pulse motor driver generating an excitation current of a pattern corresponding to the number of division per one step of the pulse motor based on the drive pulse supplied from the drive pulse generator, the number of division being set in the pulse motor driver, the pulse motor driver supplying the excitation current to the pulse motor to thereby drive the pulse motor based on micro-step driving, the control program causing the controller to execute the steps of:
   setting the cycle in the drive pulse generator every time the drive pulse is supplied from the drive pulse generator;
   switching the number of division between a first number of division N and a second number of division M smaller than the first number of division N and setting the number of division in the pulse motor driver; and
   multiplying the cycle that is to be set in the drive pulse generator in such a way that the cycle set in the drive pulse generator in a state in which the second number of division M is set in the pulse motor driver becomes N/M times the cycle set in the drive pulse generator in a state in which the first number of division N is set in the pulse motor driver.

6. An imaging apparatus that swivels a video camera for capturing a subject image and producing a video signal, by using rotational driving force of a pulse motor, the imaging apparatus comprising
   a control device that controls rotation of the pulse motor, the control device including
      a drive pulse generator configured to generate a drive pulse in accordance with a set cycle,
      a pulse motor driver configured to generate an excitation current of a pattern corresponding to the number of division per one step of the pulse motor based on the drive pulse supplied from the drive pulse generator, the number of division being set in the pulse motor driver, the pulse motor driver supplying the excitation current to the pulse motor to thereby drive the pulse motor based on micro-step driving; and
      a controller configured to set the cycle in the drive pulse generator every time the drive pulse is supplied from the drive pulse generator, wherein
      the controller switches the number of division between a first number of division N and a second number of division M smaller than the first number of division N, and sets the number of division in the pulse motor driver,
      a cycle multiplier configured to multiply the cycle that is to be set in the drive pulse generator by the controller is provided, and
      multiplication of the cycle by the cycle multiplier is so carried out that the cycle set in the drive pulse generator in a state in which the second number of division M is set in the pulse motor driver becomes N/M times the cycle set in the drive pulse generator in a state in which the first number of division N is set in the pulse motor driver.

7. A pulse motor control device comprising:

drive pulse generating means for generating a drive pulse in accordance with a set cycle;

pulse motor driving means for generating an excitation current of a pattern corresponding to the number of division per one step of a pulse motor based on the drive pulse supplied from the drive pulse generating means, the number of division being set in the pulse motor driving means, the pulse motor driving means supplying the excitation current to the pulse motor to thereby drive the pulse motor based on micro-step driving; and controlling means for setting the cycle in the drive pulse generating means every time the drive pulse is supplied from the drive pulse generating means, wherein the controlling means switches the number of division between a first number of division N and a second number of division M smaller than the first number of division N, and sets the number of division in the pulse motor driving means, cycle multiplying means for multiplying the cycle that is to be set in the drive pulse generating means by the controlling means is provided, and multiplication of the cycle by the cycle multiplying means is so carried out that the cycle set in the drive pulse generating means in a state in which the second number of division M is set in the pulse motor driving means becomes N/M times the cycle set in the drive pulse generating means in a state in which the first number of division N is set in the pulse motor driving means.

* * * * *